United States Patent Office 3,381,407
Patented May 7, 1968

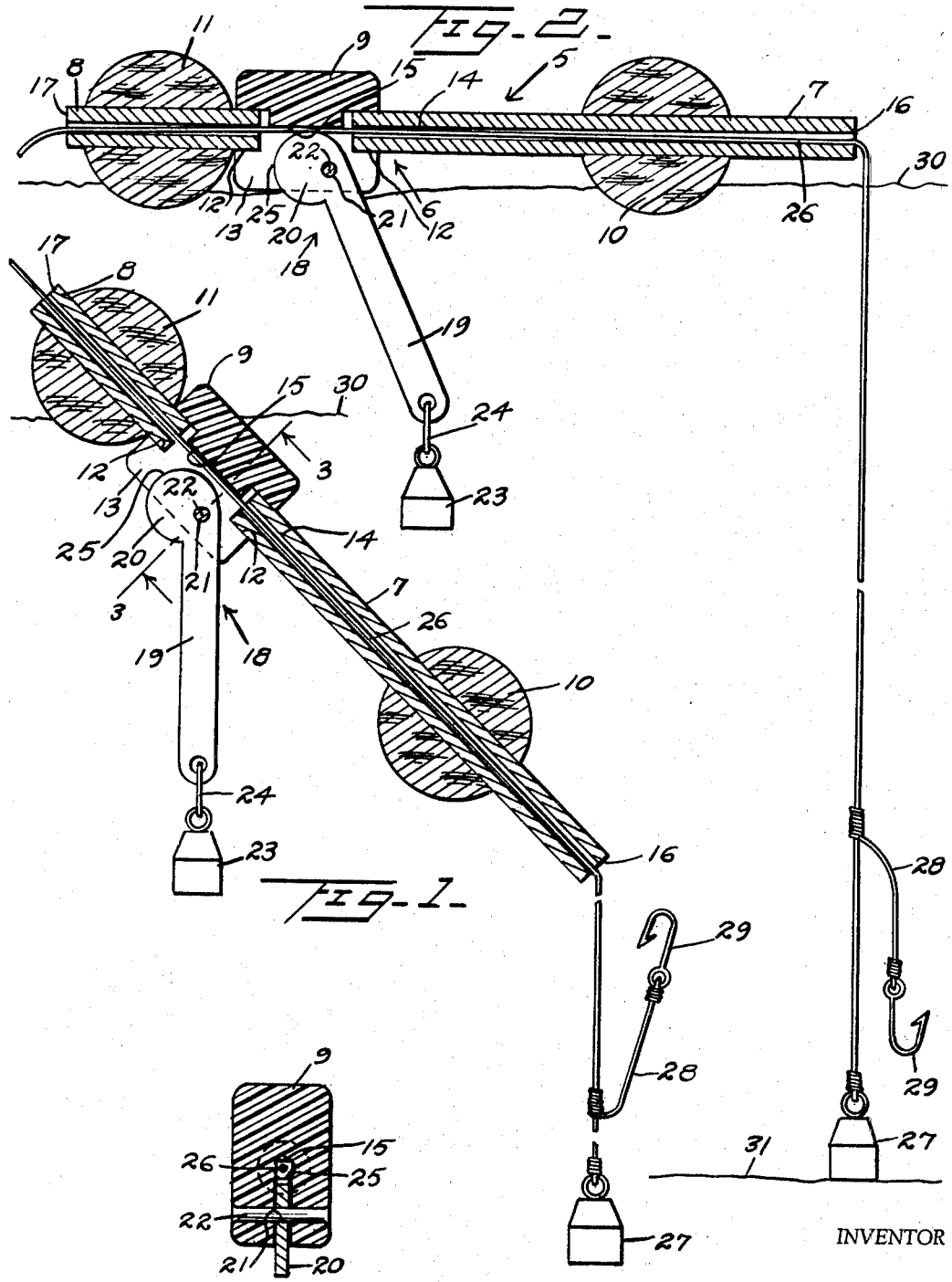

3,381,407
AUTOMATICALLY ADJUSTABLE FISHING FLOAT
WITH LINE CLAMPING MEANS
Roland A. McDougall, 704 Hall St.,
Charleston, W. Va. 25302
Filed May 17, 1966, Ser. No. 550,840
5 Claims. (Cl. 43—44.91)

This invention relates to a fishing float having gravity-actuated line clamping means for securing the float to a fishing line after the line has passed through the float a sufficient distance to permit the sinker to reach the bottom, to thereby insure that the sinker is on the bottom when the fishing float is resting on the water.

Another object of the invention is to provide a fishing float which will be released automatically from its securement to the fishing line when a fish has been hooked and is being retrieved, to enable the line to be retrieved through the float, until the sinker or a fishhook attached to the line has reached the float, so that the float will not interfere with the retrieving of the line onto a fishing reel.

A further object of the invention is to provide a fishing float having a gravity-actuated line clamping means which is automatically released after having clamped the line, to allow additional line to pass through the float in the event that the sinker changes location and in so doing moves to deeper water.

Various other objects and advantages of the invention will hereinafter become more fully apparent from the following description of the drawing, illustrating a presently preferred embodiment thereof, and wherein:

FIGURE 1 is a longitudinal substantially central sectional view, partly in side elevation and partly broken away, illustrating one position of the automatically adjustable float;

FIGURE 2 is a similar view, illustrating another position of the float, and

FIGURE 3 is a cross sectional view through a part of the float, taken substantially along a plane as indicated by the line 3—3 of FIGURE 1.

Referring more specifically to the drawing, the automatically adjustable fishing float in its entirety and comprising the invention is designated generally 5 and includes an elongated body 6 preferably composed of tubes 7 and 8, a block 9 and float elements 10 and 11.

The block 9 is preferably formed of plastic, and is somewhat elongated as seen in FIGURES 1 and 2 and is preferably of rectangular shape in cross section as seen in FIGURE 3. The block 9 has recesses or sockets 12 opening outwardly of the ends thereof in which adjacent ends of the tubes 7 and 8 are secured in any conventional manner, so that the bores of the tubes are disposed in alignment with one another. The block 9 has a slot 13 extending from end-to-end thereof which opens outwardly of its bottom and which includes a portion disposed between the adjacent ends of the bores of the tubes 7 and 8 and which last mentioned portion aligns with the two bores to form a passage 14 which extends from end-to-end through the body 6. The block 9 has a surface 15 defining a part of the top of the slot 13 which is disposed between the tubes 7 and 8 for a purpose that will hereinafter become apparent.

The tubes 7 and 8 may be formed of any rigid, preferably relatively light weight material, and the tube 7 is preferably substantially longer than the tube 8. The floats 10 and 11 may be formed of cork or other buoyant material and are preferably of spherical shape with a bore extending diametrically therethrough. The float 10 is mounted on the tube 7 at a point spaced from the block 9 and preferably near the outer end 16 of the tube 7, constituting a first end of the elongated body 6. The float 11 is mounted on the tube 8 adjacent an end of the block 9 and in close proximity to the outer end 17 of the tube 8, constituting the second end of the body 6.

The fishing float 5 additionally includes a pivotally mounted gravity actuated clamp 18 including an elongated lever 19 having a head 20 constituting one end thereof and which is provided with an opening 21. At least a part of the head, including the opening 21, is disposed in the slot 13 and a pin 22 extends through the lower part of the block 9, across the slot 13, and through the opening 21 (FIGURE 3) for swingably connecting the lever 19 to the block 9 for swinging movement longitudinally of the body 6. The lever 19 extends downwardly from the open bottom of the slot 13 and has a weight 23 connected to the lower end thereof by a link 24. The head 20 has an outer edge 25 which is eccentrically disposed relative to the opening 21 and pin 22.

A portion of a fishing line 26 is shown extending through the passage 14 with one end of the line 26 extending from the float end 17 back to a rod and reel or fishing pole, not shown, and the other end of the fishing line extending from the float end 16 to a sinker 27, which is attached to the terminal of said last mentioned end of the fishing line and to which fishing line end one or more leaders 28 may be attached and to which a fishhook or lure 29 is connected. The edge 25 and the block surface 15 constitute clamping jaws between which extends a portion of the fishing line 26. When the body 6 is disposed in substantially a horizontal position, as seen in FIGURE 2, the weight 23 will urge the lever 19 to swing clockwise about the pivot 22 downwardly and away from the tube 7 to cause the jaw 25 to assume a position adjacent the jaw 15 for clamping a part of the fishing line immovably between said jaws to prevent movement of the fishing line through the passage 14.

If the body 6 is tilted clockwise from its position of FIGURE 2 to its position of FIGURE 1 to be inclined downwardly from its end 17 to its end 16, the block 9 will rock clockwise relative to the lever 19 about the pivot 22 for causing the tube 7 to swing toward the lever 19, so that the jaw 25 is disengaged from the fishing line 26 to permit the fishing line to slide through the passage 14 or to allow the fishing float to be slid down the fishing line toward the sinker 27.

With the fishing float 5 positioned near the sinker 27 a cast may be readily accomplished. When the sinker 27 and float 5 strike the water, the weight of the sinker 27 will cause the float 5 to assume its inclined position of FIGURE 1 with the float element 11 resting on the surface of the water, as indicated at 30, and with the float element 10 and the tube 7 submerged. With the parts thus disposed, the clamping jaw 25 will be in its released position so that the line 26 may slide through the passage 14 outwardly of the tube end 16 until the sinker 27 comes to rest on the bottom 31, as seen in FIGURE 2. When this occurs, float element 10 will rise to the surface 30, since the weight of the sinker 27 is no longer supported thereby, so that the body 6 will assume a substantially horizontal position. As the tube 7 swings upwardly toward its horizontal position of FIGURE 2 from its downwardly inclined position of FIGURE 1, the block 9 will rotate counterclockwise about the pivot 22 for swinging the jaw 15 toward the jaw 25, as the tube 7 swings away from the lever 19, for clamping the line 26 between said jaws for thus securing the float 5 to the line. The float element 10 possesses sufficient buoyancy to cause the lever 19 to swing upwardly to some extent from its depending vertical position of FIGURE 1 after the jaws 15 and 25 are in clamping engagement with the line 26, so that the lever 19 will be disposed at an incline such that the weight 23 is always urging the jaw 25 toward the jaw 15 and into tight clamping engagement with the line 26.

When a fish is caught on the hook 29, either it will exert a pull on the line 26 for returning the float 5 to its inclined position of FIGURE 1 for releasing the jaws 15 and 25 from clamping engagement with the line 26, or else the float 5 will assume its position of FIGURE 1 as the line is retrieved. In either case, the line is retrieved through the float passage 14 so that the float will again assume a position adjacent to the sinker 27 and leader 28 so as not to interfere with retrieving the line when fishing with a rod and reel.

Various modifications and changes are contemplated and may be resorted to, without departing from the function or scope of the invention as hereinafter defined by the appended claims.

I claim as my invention:

1. A fishing float comprising an elongated body having a passage extending longitudinally therethrough and through which a fishing line is adapted to extend, said body including buoyant means for normally supporting the body on the surface of a body of water in substantially a horizontal position, and line clamping means including a clamping element pivotally connected to and extending from said body and gravity urged toward a depending position, a part of said element cooperating with a part of the body for clamping engagement with the fishing line when said body is in substantially a horizontal position and said element is suspended therefrom and for releasing the line when said body is rocked in one direction relative to the element toward a vertical position.

2. A fishing float as in claim 1, said body having a downwardly opening slot through which a part of the fishing line extends, said element including an elongated lever having one end engaging turnably in said slot, pivot means pivotally connecting said lever end to the body for swinging movement longitudinally of the body, and said lever end having an edge portion, forming said part of the element, disposed eccentrically of the pivot means and forming a clamping jaw for cooperation with said part of the body.

3. A fishing float as in claim 1, said elongated body including two tubes and a block disposed therebetween, and in which adjacent ends of the tubes are secured in aligned relation to one another, said block having a slot opening downwardly therefrom including a part disposed between the bores of the tubes and combining therewith to form said passage.

4. A fishing float as in claim 3, said gravity actuated element having an upper end mounted in said slot.

5. A fishing float as in claim 4, said buoyant means comprising buoyant elements mounted on said tubes.

References Cited

UNITED STATES PATENTS

| | | | |
|---|---|---|---|
| 2,440,989 | 5/1948 | Van Brunt | 43—44.88 X |
| 2,842,886 | 7/1958 | Williams | 43—44.87 |
| 2,861,382 | 11/1958 | Rosenberg | 43—44.91 |
| 3,087,275 | 4/1963 | Svoboda | 43—44.87 |

SAMUEL KOREN, *Primary Examiner.*

D. J. LEACH, *Assistant Examiner.*